United States Patent [19]

Lorenz et al.

[11] 4,216,476
[45] Aug. 5, 1980

[54] DIGITAL ELECTRONIC COMMUTATOR FOR RADIO DIRECTION FINDING SYSTEM

[75] Inventors: Richard Lorenz; Paul E. Martin, both of San Antonio, Tex.

[73] Assignee: The United States of America as represented by the Secretary of the Navy, Washington, D.C.

[21] Appl. No.: 18,023

[22] Filed: Feb. 26, 1970

[51] Int. Cl.² ............................................. G01S 3/20
[52] U.S. Cl. ...................................... 343/120; 343/118
[58] Field of Search ................................. 343/120, 118

[56] References Cited

U.S. PATENT DOCUMENTS

| | | | |
|---|---|---|---|
| 3,054,105 | 9/1962 | Steiner et al. | 343/120 X |
| 3,093,828 | 6/1963 | Stutz | 343/118 |
| 3,099,009 | 7/1963 | Stryker, Jr. | 343/120 X |
| 3,508,266 | 4/1970 | Martin | 343/113 DE X |

Primary Examiner—Maynard R. Wilbur
Assistant Examiner—Richard E. Berger
Attorney, Agent, or Firm—Richard S. Sciascia; Robert W. Adams

[57] ABSTRACT

An array of antennas is sequentially sampled by digital commutation means to provide a synchronous display of a synthesized antenna array pattern of reception on a cathode ray tube indicator. The commutation means and digital means for generating sine and cosine signals operate from a common oscillator source. Digital means are provided to advance or delay the phase relation of the pattern or of a strobe line with respect to the CRT sweep to effect rotation thereof into azimuthal alignment. Automatic bearing readout is digitally accomplished when alignment is achieved.

3 Claims, 2 Drawing Figures

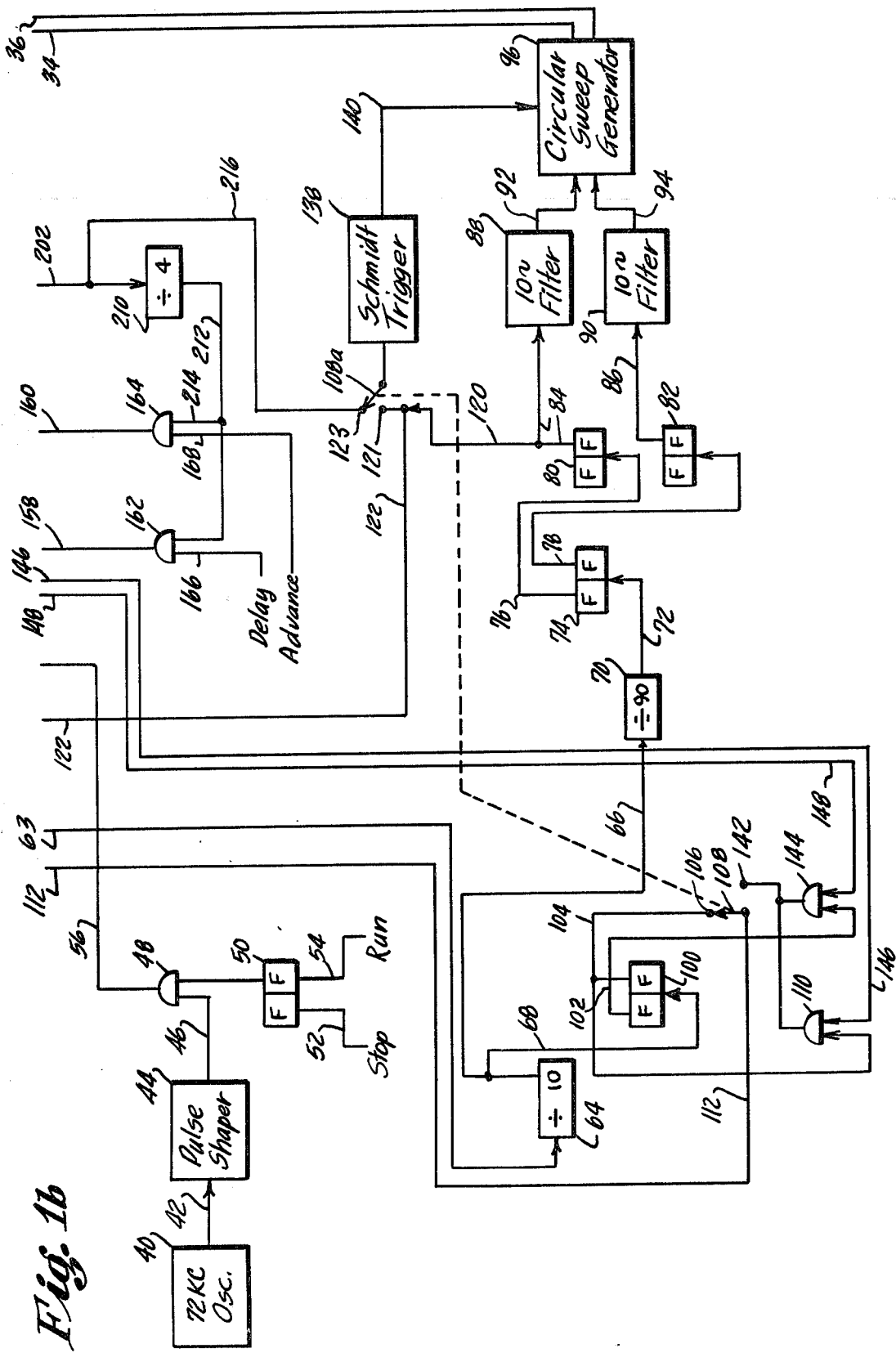

DIGITAL ELECTRONIC COMMUTATOR FOR RADIO DIRECTION FINDING SYSTEM

BACKGROUND OF THE INVENTION

This invention relates to radio direction finder displays and more particularly to means for generating a polar display of the antenna reception pattern.

Heretofore such displays have utilized electromechanical goniometer means for synchronously sampling an array of antennas and for generating sweep signals. Such goniometer means have been heavy, expensive, and subject to required maintenance of motors, brushes and the like.

SUMMARY OF THE INVENTION

With the foregoing in mind it is a principal object of this invention to provide digital electronic commutator means which leads itself well to solid state construction.

It is another object of this invention to provide a digital electronic commutator system which effects sequential and continuous RF commutation of an array of receiving antenna, and synchrononous display of a synthesized antenna array reception pattern on a cathode ray tube indicator.

Another object of the invention is to provide sine/cosine signals which, when combined with a solid state balanced modulator, replace the mechanically rotated sine/cosine indicator goniometer assemblies presently used by some DF displays.

As another object this invention aims to provide an improved, digital, electronic system for providing azimuthal angle of arrival information on received RF signals in the form of direct bearing readout in response either to electronic rotation of the displayed pattern of reception into alignment with a strobe line, or to electronic rotation of a strobe line into alignment with the pattern.

BRIEF DESCRIPTION OF THE DRAWINGS

Other objects and advantages of the invention will become apparent from the following description of a preferred embodiment when said in conjunction with the accompanying drawing sheets, forming a part of this specification, in which:

FIGS. 1a and 1b constitute a diagrammatical illustration, in block form, of a radio direction finder system comprising digital commutator means embodying the invention.

DESCRIPTION OF THE PREFERRED EMBODIMENT

Figure 1A:
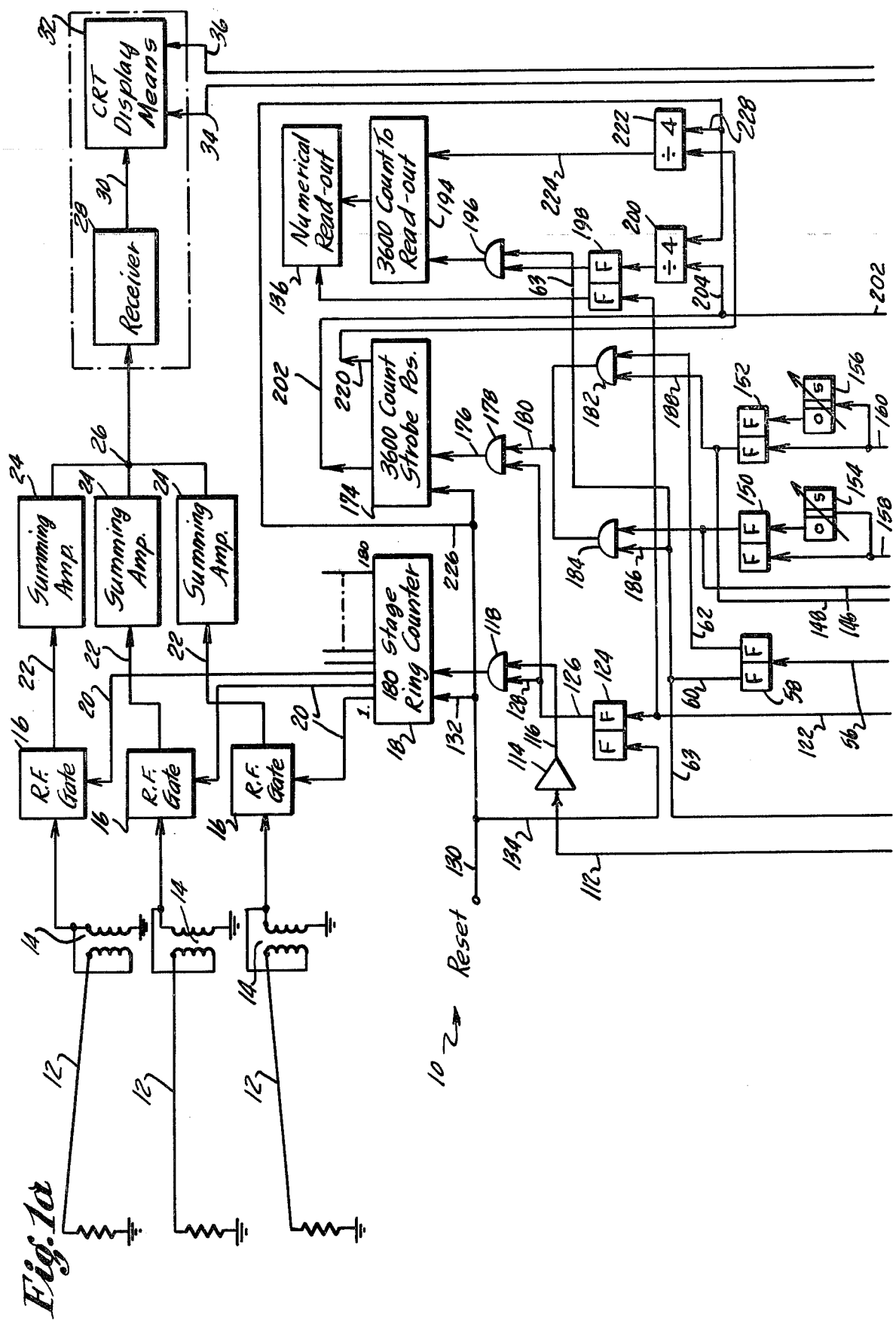

Illustrated in the drawings and described hereinafter is a direction finding radio receiver system 10 incorporating a digital electronic commutator embodying the invention. The receiver system 10 is of the type having an array of 180 Beverage antennas 12 of which three are shown. The antennas 12 diverge by 2° so as to provide complete azimuthal coverage. Each antenna 12 is coupled by an impedance matching transformer 14 to a corresponding one of 180 RF gates 16. The RF gates 16 are enabled or inhibited by logic signals developed in a ring counter 18 and applied to the RF gates 16 as shown via lines 20. These logic signals allow sequential time sampling of each of the antennas 12.

The outputs of the RF gates 16 are applied via lines 22 and respective summing amplifiers 24 to a summing point 26 which serves as the point to a receiver 28. The result of the foregoing is to effect commutation of the inputs from the array of antennas. The signals received and detected are converted by receiver 28 to commutated video signals indicated as output line 30 from the receiver. The commutated video output of the receiver 28 is in turn the input to a direction finder cathode ray tube display means 32.

In order to operate the above described commutation means with direction finder display means 32 utilizing double balanced modulators instead of the usual goniometer assembly for generation of a polar display of the array pattern, it is necessary to generate suitable sine and cosine voltages to drive the double balanced modulators, the second input to each of which is the commutated video.

The sine and cosine voltages, represented by lines 34, 36 to the display means 32, must be generated in synchronism with the commands from the ring counter 18 to the RF gates 16 to provide correlation between the direction of a received signal and the cathode ray tube display angle.

Generation of the sine and cosine voltages is accomplished by circuitry illustrated in the Figures and about to be described. These signals are derived from a 72 KHz multivibrator oscillator 40, the output of which on line 42 is applied to a shaper 44 providing on line 46 an AC wave form more suitable to digital operations. The 72 KHz signal on line 46 is passed by an AND gate 48 when enabled by an on signal from a flip-flop 50 which is responsive to start and stop signals via lines 52 and 54 from a suitable front panel control (not shown). The 72 KHz signal on line 56 from the AND gate 48 is digitally divided by a flip-flop 58 into 36 KHz signals which are 180° out of phase on each of lines 60, 62. The 36 KHz signal on line 60 is applied via line 63 to a divide by 10 circuit 64 to provide a 3.6 KHz signal on lines 66 and 68.

The 3.6 KHz signal on line 66 is applied to a divide by 90 circuit 70 which provides an output on line 72 of 40 Hz. This 40 Hz signal is divided by a flip-flop 74 into two 20 Hz signals represented by lines 76 and 78. The 20 Hz signals on lines 76, 78 are divided by flip-flops 80, 82 respectively, inot 10 Hz signals on lines 84 and 86 to 10 Hz band pass filters 88 and 90. The 10 Hz outputs of filters 88 and 90 are applied via lines 92, 94 to a circular sweep voltage generator 96, the outputs of which are the required sine ad cosine voltages represented by lines 34, 36 to the DF display means 32 mentioned above.

The 180 stage ring counter 18 also derives its stepping signals from the 72 KHz oscillator 40. Thus, the 3.6 KHz signal on line 68 from the divide by 10 circuit 64 is applied to a flip-flop 100 which reduces the signal to 1.8 KHz on each of lines 102 and 104, the latter being applied to a terminal 106 of a switch 108 and to one input of a normally closed AND gate 110, the purpose of which will presently be made apparent. With the switch 108 in its illustrated position, the 1.8 KHz signal may be traced via line 112, a driver amplifier 114, and line 116 to one input of an AND gate 118. This AND gate is enabled to pass the 1.8 KHz clock signals to the counter 18 by a sync signal derived from the flip-flop 80 via lines 84, 120, 122, a flip-flop 124, and lines 126, 128. Accordingly, when the counters 18 and 64 and flip-flop 124 have been returned to zero as by a reset signal from the front panel via lines 130, 132, 134, clock signals will again be applied to the ring counter 18 only after the sync singal appears on line 128.

Since the drive signal for the ring counter 18 is derived from the same 72 KHz oscillator 40 as are the 10 Hz sine and cosine signals for the circular sweep of the display means 32, the sequential sampling of the RF gates 16, and consequently the receiving antennas 12, is in synchronism with the circular display sweep. After initial calibration, the asimuthal direction of a received RF signal will be displayed by the display means 32. If the display is calibrated in degrees, the direction of the received signal will be indicated by the pattern display.

In the initial calibration, it is customary to align a vertical line through the center of the CRT indicator, this line being referenced to true north direction. This line may be in the form of a strobe line drawn electronically on the CRT once each sweep in response to a strobe line pulse put out by a Schmidt trigger 138 via a line 140 to the circular sweep generator 96. This is the condition when switch 108a engages contact 121 so that the Schmidt trigger receives the 10 Hz output of flip-flop 80. When the switch 108a (and switch 108 coupled thereto) is in its illustrated position engaging contact 123, the Schmidt trigger provides strobe pulses at rates that may cause the strobe line to slew in one direction or the other while the pattern position remains stationary as will be explained more fully hereinafter.

When calibration has been accomplished, the pattern of RF reception may be electronically rotated by the commutator circuitry being described and aligned symmetrically about the vertical strobe line while logic means within the commutator circuitry count and store the number of degrees (to a 0.1° resolution) the pattern has been rotated. This is then added to 0.0° or subtracted from 360.0° and visually displayed by a numerical readout 136.

Alternatively, the pattern may be held stationary while the strobe line is electronically rotated to a position through the center of the pattern. Logic means within the commutator circuitry counts the degrees of rotation of the strobe line and provides a numerical readout thereof corresponding to the direction from which a radio signal is received.

Pattern position rotation or slew in one direction or the other is accomplished electronically by allowing the 1.8 KHz trigger signal normally passed by the AND gate 118 to the ring counter 18 to be as much as doubled or halved in frequency. This can be effected after the switch 108 is moved to the contact 142, placing line 112 in connection with the outputs of AND gate 110 and another AND gate 144, each of which have as one input a 1.8 KHz signal from divide by 10 circuit 64. This also moves switch 108a to contact 121, the position in which the strobe line remains stationary.

The other inputs 146 and 148 to the AND gates 110 and 144, respectively, are delay and advance signals which control the increase or decrease in frequency of signals passed by these gates to line 112 and hence to the ring counter 18.

The delay and advance signals on lines 146 and 148 are fed from flip-flops 150, 152, the outputs of which may be rate controlled by variable one-shot multivibrators 154, 156.

The flip-flops 150, 152 and their corresponding one-shots 154, 156 are supplied with pulses via lines 158, 160 from AND gates 162 and 164 in response to directional commands thereto via lines 166, 168.

Input pulses to a 3600 count strobe position counter 174 are normally passed via line 176 by an AND gate 178 which receives a 3.6 KHz signal via line 180 from a normally open AND gate 182. The AND gate 182 receives the 3.6 KHz signal via line 62 from flip-flop 58 while a normally closed AND gate 184, also connected to line 180, receives a 180° out of phase 3.6 KHz signal from the flip-flop 58 via lines 60, 63 and 186.

The input pulses to the counter 174 are halved or doubled simultaneously with halving or doubling of the input pulses to the ring counter 18. As these two drive signals (to the ring counter 18 and the strobe position counter 174) are derived from a common oscillator, they remain in synchronism. The counter 174 thus records the number of degrees, to a tenth of a degree, that the ring counter is leading or lagging a reference mark on the 10 Hz sine and cosine signals.

Automatic numerical read-out of the bearing of the radiation source is accomplished at indicator 136 driven by a read-out counter 194 which may be supplied with the 36 KHz signal on line 63 via a normally open AND gate 196. The count in counter 194 is started by a flip-flop 198 under the control of a divide by four circuit 200 in response to the beginning count signal from the counter 174 derived via lines 202, 204. The count in counter 194 is stopped by a sync signal applied to the flip-flop 198 via line 206 and derived from the flip-flop 80. The line 202 further feeds a divide by 4 circuit 210 which provides one input to each of the directional control AND gates 162, 164 as shown by lines 212, 214.

At times it is desired to maintain the CRT pattern stationary and to determine the azimuthal direction of arrival of a received signal by rotating or slewing the superimposed strobe line to be symmetrically aligned with the "center of Gravity" of the received antenna pattern. This may be accomplished when the switches 108, 108a are moved to their illustrated positions, in which case the Schmidt trigger 138 is fed from the counter 174 via lines 202, 216, and contact 123 of switch 108a. The strobe line initially appears at the 0° position and is generated from the zero pulse of the strobe position counter 174.

In order that the strobe line may be rotated, the drive signal to the strobe position counter 174 is doubled or halved in frequency (but the drive signal to the ring counter 18 is not in this case). The pattern display is therefore always in synchronism with the 10 cycle sine and cosine sweep voltages, and thus is stationary on the CRT display means 32 and may be at any polar angle with respect to the vertical line at 0°. When the superimposed strobe is symmetrically aligned over the received signal pattern the drive signal to the 3600 count strobe position counter is permitted to resume its synchronous frequency and thus ceases to rotate. However, its zero reference output is permanently slewed (until reset) with respect to the sync point from the 10 Hz sine signal. To accomplish this, the bearing readout counter 194 is enabled by the sync pulse on line 206 produced by the zero crossing of the sine voltage (which occurs at the zero degree alidade location) and is stopped by the zero output of the strobe position counter 174. The azimuthal direction can then be read at 136 as when the pattern was rotated to align with the strobe line. Reset of the counter 194 occurs each time the strobe line rotates to the 360.0° position at which time a reset signal is derived from the counter 174 via line 220 and triggers a divide by four circuits 222, the output of which on line 224 zeroes the counter 194. Reset of the counter 174 and of the circuits 200 and 222 is accomplished via lines 130, 226, and 228.

Obviously many modifications and variations of the present invention are possible in the light of the above teachings. It is therefore to be understood that within the scope of the appended claims the invention may be practiced otherwise than as specifically described.

What is claimed is:

1. In a radio direction finder system having an azimuthal array of directional antennas, receiver means, a source of slewing direction command signals, and cathode ray tube display means, electronic commutator means comprising:

a plurality of RF gates and each connecting at least one of said antennas to said receiver means;

ring counter means having a plurality of stages each corresponding to at least one of said RF gates and operative to enable said RF gates to sample radio reception by said antennas sequentially as said ring counter stages are triggered;

a source of signals at a predetermined first frequency;

first digital logic means for deriving signals of a second predetermined frequency from said first frequency signals and applying them as trigger signals to said ring counter means;

second digital logic means for deriving sync signals and sine and cosine signals of a predetermined frequency from said first frequency signals and applying them to said display means whereby sweep of the cathode ray tube thereof is synchronous with operation of said ring counter so that a pattern representative of radio signals about the azimuth is displayed; and Schmidt trigger means responsive to one of said sync signals to provide signals to said display means for generation of a strobe line as a bearing indicator each sweep of said cathode ray tube.

2. Electronic commutator means as defined in claim 1, and further comprising:

third digital logic means cooperable with said first logic means to selectively provide, in response to slewing direction command signals, signals of double or half said second predetermined frequency as trigger signals to said ring counter means, whereby said pattern may be rotated in one direction or the other into alignment with said strobe line; and counter means responsive to said frequencies and said sync signals to count and record the relative rotation between said pattern and said strobe line to achieve said alignment.

3. Electronic commutator means as defined in claim 2, and further comprising:

switch means operative to render said third digital logic means inoperative to alter said trigger signals from said second frequency, and operative to provide said Schmidt trigger means with signals at half or double the frequency of said sync signals in response to said slewing direction command signals, whereby said strobe line may be rotated in one direction or the other into alignment with said pattern.

* * * * *